Figure 1:
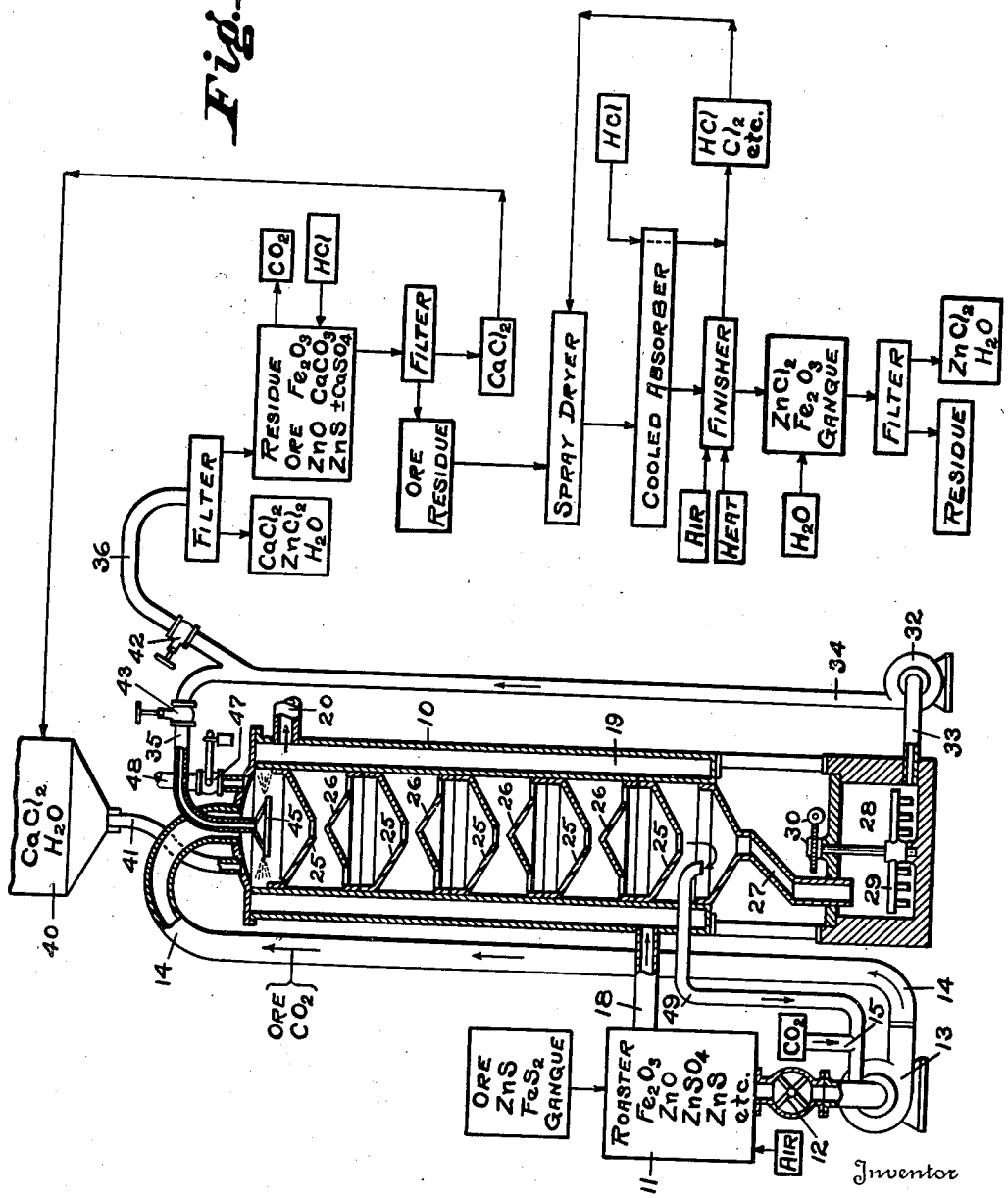

June 29, 1937.　　　　T. A. MITCHELL　　　　2,085,114
METHOD OF TREATING AN ORE MATERIAL
Filed Nov. 5, 1934　　　　2 Sheets-Sheet 2

Inventor
THOMAS A. MITCHELL
By Clayton L. Jenks
Attorney

Patented June 29, 1937

2,085,114

UNITED STATES PATENT OFFICE 2,085,114

METHOD OF TREATING AN ORE MATERIAL

Thomas A. Mitchell, Denver, Colo., assignor to Hughes-Mitchell Processes, Incorporated, Denver, Colo., a corporation of Wyoming Application November 5, 1934, Serial No. 751,476

15 Claims. (Cl. 75—111)

This invention relates to a method of treating an ore material for solubilizing ore metal values therein and particularly for the chloridization thereof. The invention also relates specifically to the treatment of an oxidized zinc bearing ore material, and particularly a roasted sulfide ore containing zinc-oxygen compounds and other refractory but chloridizable values.

If zinc oxide is treated with a solution of alkaline earth metal chloride in the presence of carbon dioxide gas, there results the formation of zinc chloride in solution and a precipitate of alkaline earth metal carbonate. If zinc sulfate is also present, calcium sulfate is formed. This invention employs that chemical reaction in the treatment of an ore material containing an ore metal oxide as well as other values which may be solubilized.

The primary object of this invention is to provide an efficient and economical process of this type in which an alkaline earth metal chloride is used in combination with carbon dioxide as a chloridizing reagent and in which the reagents may be recovered and cyclically used in the process. A further object is to utilize such a procedure for preliminarily removing zinc or other metal oxide from an ore material prior to treatment of the material for chloridizing the refractory values therein.

Another feature of the invention involves the treatment of an ore material, whether or not it has been preliminarily subjected to a solubilizing treatment, by a procedure which involves passing an aqueous sludge of the material through a spray drying apparatus which serves to dry the material and prepare it for treatment in a substantially dry condition by various reagents. Also, this spray drying of the ore material may be carried on in the presence of a gaseous reagent, such as hydrochloric acid or chlorine, which serves to solubilize an ore value as the sludge is being dried.

Further objects of the invention are to utilize such procedures in the treatment of an ore and to so coordinate the various steps of the process as to solubilize the values in the ore material effectively. Other objects will be apparent in the following disclosure.

The various features of this invention may be utilized separately or they may be combined in the treatment of a complex ore. As an example showing the different features applied to a single complex ore, such as one containing zinc, lead, iron and other values associated as sulfides, the following procedure may be adopted. The ore may be first roasted under conditions which result in the conversion of the iron to ferric oxide and the zinc to zinc oxide, with or without zinc sulfate, together with lead oxide and/or lead sulfate, after which the roasted ore material may be treated in a tower with a solution of alkaline earth metal chloride, and particularly calcium chloride, barium chloride or strontium chloride, while carbon dioxide gas is passed through the tower. The resultant solution contains zinc chloride together with other soluble ore metal values and may be withdrawn for further treatment, as desired. The ore material, which is wet and is in a finely divided condition as a sludge mixed with water, may then be passed through a spray drying apparatus where the ore particles are dried and the water removed. This spray drying apparatus may also include the treatment of the ore material with a chloridizing gas and thus serve in a single stage both to dry the material and to chloridize further values, such as residual zinc oxide, and iron oxide, if desired. Thereafter, the ore material in a substantially dry condition, but which may contain some moisture content, may be then further chloridized, such as by the procedure of the Mitchell process, as described in the Mitchell Patents Nos. 1,943,332, 1,943,333, 1,943,335 and 1,943,341 of January 16, 1934 and 1,979,281 of November 6, 1934.

Referring to the drawings, I have there shown diagrammatically the various steps of a process, as well as certain pieces of apparatus, which are suitable for treating such a complex ore containing zinc sulfide; but it will be appreciated that various modifications may be made in the process, as well as the types of apparatus employed, in accordance with the nature of the ore which is being treated.

Figure 2:
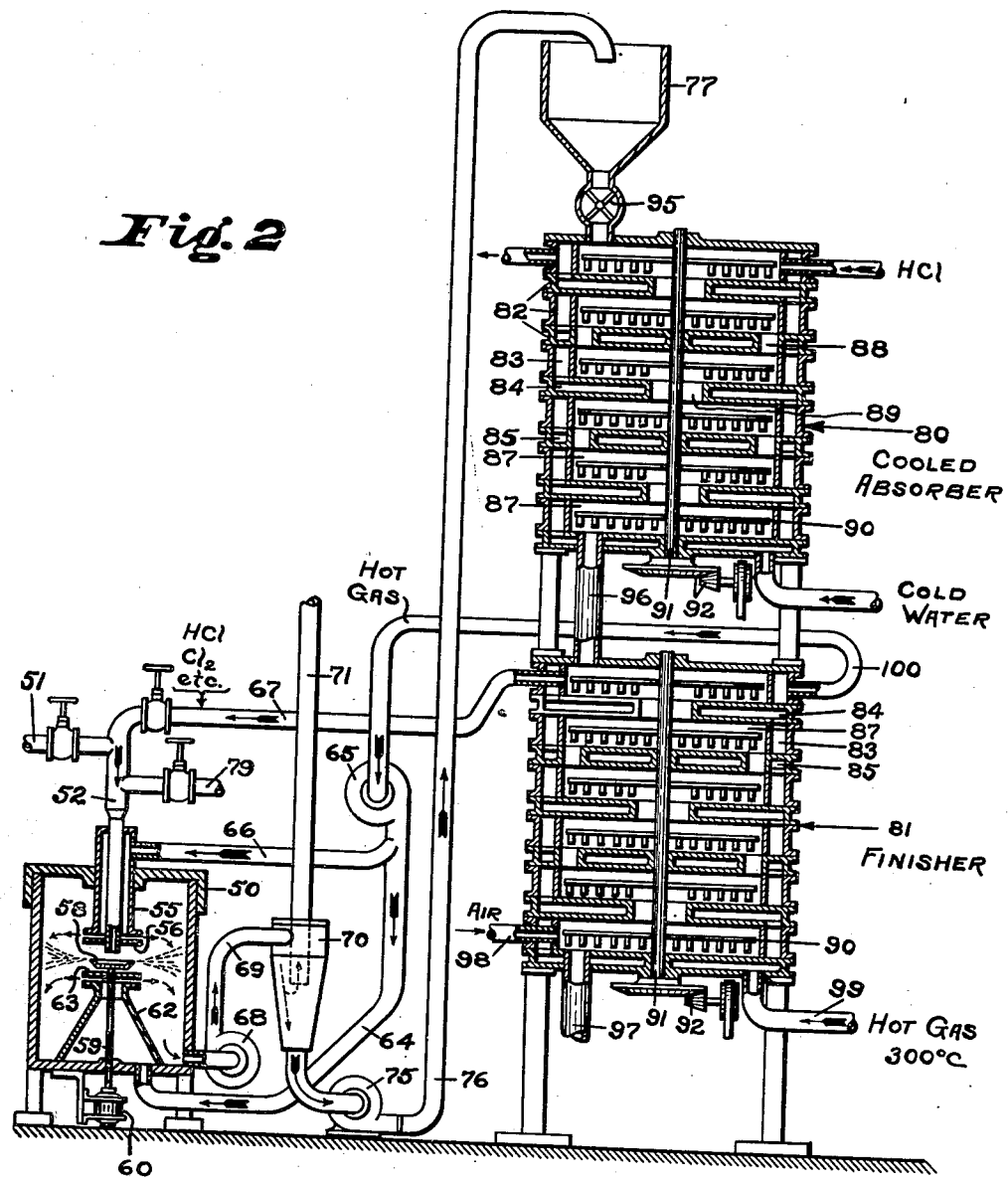

In the drawings, Fig. 1 shows a flow diagram of the entire process and illustrates diagrammatically the type of apparatus employed for the initial chloridization of zinc oxide; and Fig. 2 is a diagrammatic view, largely in section, of suitable apparatus as well as the steps of the process employed for chloridizing the ore residues derived from the chloridizing apparatus illustrated in Fig. 1.

Assuming that the ore to be treated contains zinc and iron sulfides together with other compounds, such as lead and silver sulfides, which will be ignored in the following explanation, the following preferred procedure will serve for its chloridization. The raw ore may be either concentrated or not, as desired, and it is crushed to a suitable degree of fineness, such as will pass through a screen of 100 meshes to the linear inch. Then it is roasted in accordance with the standard or other suitable procedure to form zinc oxide with or without zinc sulfate. This roasting operation will be carried on at as low a temperature as is suitable and with sufficient air to form zinc oxide and iron oxide, but it is not necessary that all of the zinc be converted to an oxygen compound because of the ability of the later chloridizing steps of the process to convert the residual zinc sulfide and other compounds to a chloride. A low temperature operation is particularly desirable since it minimizes the formation of complex compounds, such as zinc silicate, zinc ferrate, etc., which are difficult to chloridize. If desired, this procedure may be carried on in accordance with the prior Mitchell Patent No. 1,943,331 of January 16, 1934, but it is to be understood that various other roasting processes may be employed and that the ore material need not be roasted with lime to prevent the formation of zinc sulfate, since the latter will be effectively taken care of in this process. The ore, if desired, may be roasted under such conditions as will produce a considerable amount of zinc sulfate, since the sulfate radical will be removed as an insoluble alkaline earth metal sulfate during the first chloridizing step.

The roasted ore material, which is kept preferably in a finely divided condition or is again crushed after roasting, is now passed into an absorption tower 10 (Fig. 1) where it is initially treated with alkaline earth metal chloride in solution and carbon dioxide gas. The roasted ore may be fed from the roaster 11 through a rotary valve 12 which prevents the free flow of gases therethrough, and it is then forced by means of the fan 13 to pass through the pipe 14 into the upper end of the tower 10. Carbon dioxide gas from a suitable source, and particularly such as may be derived from a later step in the process, is introduced through the pipe 15 and carried with the ore to the absorption tower.

The solubilizing action of the reagent in this tower 10 is increased by heating the material and holding the gas under pressure. One feature of this invention involves passing the roaster gases containing sulfur dioxide, etc., through the pipe 18 into an annular chamber 19 which surrounds the absorption tower 10 and thus serves to impart heat thereto. The cooled roaster gases pass outwardly through the pipe 20 and may be disposed of as desired. It will be understood that the temperature of this absorption tower may be suitably regulated, such as by regulating the quantity of roaster gases passing to the chamber 19 and by admitting cooling air thereto, if desired. Various mechanical provisions may be employed for this general purpose.

The absorption tower 10 may be constructed of suitable material and design to satisfy its main purpose of giving a prolonged contact of the roasted material, as it falls through the tower, with the chloridizing reagents. As illustrated, the cylindrical chamber 10 may be provided with a set of alternately arranged conical baffles 25 and 26. The baffles 25 cause the material to pass inwardly to a central opening and then drop upon the point of the cone 26 and thus be caused to flow outwardly to passages through which it falls to the next baffle 25 where it again travels inwardly, as is readily apparent by inspection of the drawings. The material is collected at the bottom of the absorption chamber by a pipe 27 and is thus carried to a sump 28 where the pulp of ore material and water is kept thoroughly agitated by means of rakes 29 revolved by the driving gear mechanism 30. A pump 32 and connecting pipes 33 and 34 remove the pulp from the bottom of the sump for return to the top of the chamber 5 through the valved pipe 35 or for passage to a further apparatus through the valved pipe 36.

The chloridizing reagents are a strong solution of calcium chloride in water and carbon dioxide gas, which serve to convert zinc oxide to zinc chloride while the calcium chloride is transposed to calcium carbonate. It will be understood that barium and strontium chlorides will react similarly and are the full equivalents thereof. The solution of alkaline earth metal chloride may be introduced from a tank 40 and by means of a valved pipe 41 into the top of the tower. The carbon dioxide gas travels upwardly with the ore pulp and thus all of the ingredients meet in the upper part of the absorption tower. The ore is preferably treated in a repeated cycle by closing the valve 42 in the pipe 36 and opening valve 43 in pipe 35. The pulp and water may be sprayed with high velocity against the plate 45 which is suitably fastened beneath the outlet of the ore inlet pipe 14 and beneath the outlet of the pipe 35, as illustrated. Any suitable spraying apparatus may be employed, such as a rotary plate or other device, and this apparatus may be of the general type of the sprayer in the drier described below.

In this way, the ore material and calcium chloride solution are thoroughly mixed and as they travel downwardly over the set of baffles, the carbon dioxide gas reacts to form the precipitate, calcium carbonate, and the zinc oxide goes into solution as zinc chloride. If zinc sulfate is present, the calcium chloride will react directly therewith to form zinc chloride and the insoluble calcium sulfate. The pressure of the gas within the system may be suitably controlled, such as by means of a standard form of pressure valve 47 in the outlet pipe 48. It will also be noted that a return pipe 49 is provided for removing the excess of carbon dioxide gas from the absorption tower and returning it to the pump 13 for intermingling with further ore, thus making the process continuous and allowing the reaction to go on until the ore has been sufficiently treated.

If the roasted ore is fed directly into contact with the calcium chloride solution while it is still hot as it comes from the roaster, the heat of the roasted material will thus be conserved and the sudden thermal shock will aid in breaking up the ore particles and aid in bringing the reagent solution into intimate contact with the zinc oxide values. By this procedure of treating zinc oxide with a solution of calcium chloride in the presence of carbon dioxide, I am able to get a zinc chloride solution of high concentration without difficulty, such as 50° Bé., and which, therefore, is particularly suitable for processes requiring a concentrated zinc solution.

If the ore is to be subjected to a further chloridizing treatment, as is generally required for a complex ore, then the ore sludge or pulp is preferably dried and treated by a chloridization process in which ferric or ferrous chloride is a primary reagent, although various other procedures may be adopted. It may also be solubilized by suitable gases either during or following the drying operation.

At the end of the absorption tower treatment, the ore pulp contains such residual zinc oxide, sulfide and other compounds as may be present, together with the ferric oxide, calcium carbonate, calcium sulfate and other ingredients including the gangue.

The alkaline earth metal carbonate which is thus intermixed with the ore material may be present in such a large amount that it will tend to cause closure of the pores and spaces between the ore particles during the subsequent dry chloridizing treatment with hydrochloric acid gas, and particularly because of the deliquescent nature of calcium chloride. It is, therefore, desirable to remove this alkaline earth metal carbonate from the ore material prior to the subsequent dry treatment. Moreover, it is desirable to reclaim the alkaline earth metal for re-use in the initial chloridizing step. Hence, the ore material is preferably subjected to the action of an acid or other reagent capable of dissolving the alkaline earth metal carbonate, and for this purpose I preferably use a chloridizing agent, such as hydrochloric acid, which will convert the alkaline earth metal carbonate to a chloride so that it may be returned to the first stage and there be re-used repeatedly in the process.

To this end, the partially treated sludge or ore pulp is passed through the pipe 36 into a filtering apparatus of suitable type where water solution of the zinc chloride and excess of calcium chloride is removed for such use as may be desired. The residue is then treated while still in its wet condition with a suitable acid, such as with a dilute solution of hydrochloric acid. This results in the conversion of the calcium carbonate to calcium chloride in solution and the carbon dioxide gas is driven off for further use in the process, if desired. Substantially all of the hydrochloric acid may be absorbed during this treatment by the residual zinc oxide and the ferric oxide which are present. Any calcium sulfate that is present will remain in its insoluble form and, of course, any hydrochloric acid which remains in solution will be effective during the later chloridizing stages of the process. By leaching or filtering the solution from the residue, the solution of calcium chloride, which may contain some further amount of zinc or other chlorides, may now be returned to process for further treatment in the absorption tower 10. The wet ore residue, which may be washed, if desired, or otherwise treated, is now ready for the further chloridizing stages. These are diagrammatically represented in the drawings as comprising a spray drier, a cooled absorber and a finisher.

The ore residue with a suitable amount of water is introduced into the spray drier 50 (Fig. 2). This spray drier may be employed either to dry out the water from the ore material and render it suitable for use in the absorber and finisher apparatus or, and preferably, it may be employed for a further chloridizing operation, in which case the wet ore material is treated in the spray drier with both hot air and chloridizing gases, such as hydrochloric acid and chlorine, or with the hot chloridizing gases alone if heated to a sufficiently high temperature. Other solubilizing gases may also be employed.

The spray drier may comprise any suitable construction, such as is well known on the market. In the present case, it is illustrated diagrammatically and with various parts exaggerated in size as involving a closed casing into the upper end of which the ore pulp is fed by means of the valved pipe 51 entering the vertical pipe 52 which passes through an opening in the cover of the apparatus 50. A large vertical pipe 55 forms an annular passage around the pipe 52 and serves to introduce hot air or gas into the upper portion of the casing. A baffle 56 may be suitably mounted on the lower end of the pipe 52 adjacent the exit of this annular passage to cause the hot gas to be distributed outwardly as indicated by the arrows. Beneath the outlet of the ore pipe 52 is a plate 58 which is mounted on and rotates with the upper end of a vertical shaft 59 driven at high speed by a suitable motor 60, these parts being so constructed and mounted as to satisfy the functions here desired. A hollow cone 62 and a baffle plate 63, spaced from the upper open end of the cone as illustrated, serve for introducing hot air or gas into the casing beneath the rotating plate 58. This heated gas enters the cone through the pipe 64, and a fan 65 serves to force the hot gas through the pipes 64 and 66, the latter communicating with the annular chamber formed by the pipe 55.

If it is desired to chloridize the ore material within this drying chamber, then hydrochloric acid gas and/or chlorine gas may be introduced through the pipe 67 into the upper end of the pipe 52 through which the ore pulp enters, so that the gas will be intermingled therewith in the absorption chamber. The gas may be forced into the chamber by means of a suitable fan or other pressure apparatus and its quantity regulated in accordance with the requirements of the particular ore being treated. In this treatment, the residual zinc oxide and the iron oxide are intended to be converted to zinc and iron chlorides. However, other suitable gases may be likewise employed for converting an ore metal value to a soluble compound.

The operation of this drier and chloridizer will be readily apparent. The wet ore pulp is thrown under pressure against the top of the high speed plate 58 and the ore is broken up into its finely divided particles as it comes from the previous stages of the apparatus. The chamber of the drier 50 is sufficiently large so that the material is dried in the presence of the very hot gases introduced into the chamber. The ore powder falls to the bottom of the casing for removal therefrom. The chloridizing gas, if used, is thus intimately associated with the ore and can attack it readily.

The now dried and further chloridized ore material is removed from this chamber 50 by means of the fan 68 and is passed through the pipe 69 into the cyclone 70 which is of standard and well-known construction. Here, the gas laden with the ore particles is caused to whirl within the chamber and to form an annular zone of dust which settles to the bottom of the chamber and is removed therefrom while the gases exhaust through the vertical pipe 71. The dried ore material in granular or pulverulent form is now transported by means of the pan 75 and pipe 76 to a storage bin 77 where it is held for passage to the final stages of the chloridizing treatment.

It is also within the scope of this invention to utilize the spray drying apparatus for the treatment of wet ore material derived from other sources than above described. For example, a roasted ore may be leached with hydrochloric or sulfuric acid to remove a desired ore metal oxide, such as zinc or copper oxide. The residue from this leaching operation is wet, and if it is to be treated in a subsequent dry operation, it is, therefore, desirable to remove the water by a simple and economical step. For this purpose, the leached ore material, with a sufficient supply of water to make the mass flow readily, is introduced through the pipe 79 into the spray drying apparatus and there subjected to the treatment above described, either for the purpose of drying it or for drying and solubilizing it by means of the reagent gas introduced into the chamber.

Although I have shown in the drawings that the waste heat from the finisher is utilized in the spray drying apparatus, it is equally feasible to employ the waste heat from the roasting operation, whether the roaster be of the standard shelf type or the rotary tube type, or whether it be a flash roaster in which the ore particles are subjected to the oxidizing action of air while falling freely through a large heated chamber, as described and claimed in my copending application Serial No. 751,477 filed on even date herewith. In any of these cases, the sulfur-oxygen gases derived from the roaster may be employed to heat a current of air by means of a suitable heat exchange apparatus, and this current of air will then be employed in the spray drier. It will also be appreciated that by this combination of steps, I may both spray dry the ore material as well as convert a desired ingredient to a soluble compound by means of many kinds of gaseous reagents. Hence, this feature of the invention is broadly useful by itself in the treatment of various chemical materials which are introduced into the drying chamber as a wet sludge and are taken from the chamber as a dry material containing a different chemical compound formed during the spray drying operation.

The process as illustrated in the drawings calls for a further dry chloridizing operation. This comprises treatment in a cooled absorber and a finisher which may be carried on in accordance with the procedure set forth in the above-mentioned prior patents describing the Mitchell process. It will, however, be understood that various types of chloridizing procedure may be adopted, and particularly any of those methods which involve the chloridization of the residual ore metal sulfides and other compounds by means of either ferric or ferrous chloride or both.

The process and apparatus illustrated in the drawings may be briefly described as follows. The process involves the treatment of the ore in a cooled absorber 80 where ferric and/or ferrous chloride is formed, if not produced to the required extent in the spray drier. In this cooled absorber, ferric chloride is caused to react with further ore values and convert them to chlorides. Strong hydrochloric acid gas is introduced into the upper one of a series of absorption chambers and serves to react in the absence of any material amount of air with the iron oxide in the ore material and convert it to iron chloride. The temperature may be maintained as desired. It is preferably held below 100° C., and ordinarily in the vicinity or below 90° C., or at that temperature at which the crystalline hydrated ferric chloride will be stable and will neither melt nor become dissociated by means of air. If air is fully eliminated from the reaction chamber, then the temperature may be much higher than 100° C. at the upper end of the reaction chamber, if desired. In the present case, however, cold water is utilized to maintain the temperature below 90° C. at the exit end of the cooled absorber and so insures the formation of crystalline hydrated ferric chloride from ferric oxide in the ore.

The cooled absorber and the finisher apparatus may comprise a series of hollow walled units 82, as shown in the prior Mitchell Patent 1,977,238 of October 16, 1934, which are so constructed as to provide an annular cooling chamber 83 and hearths 84 and 85 which are hollow and communicate with one another, so that the hearths and annular chambers 83 form a cooling zone substantially entirely surrounding the reaction chambers 87 within which the ore material is treated. Passages 88 and 89 serve for passing the ore from one reaction chamber to another; and revolving rakes 90 are provided to move the ore material from one chamber to another. The rake arms are mounted on the shaft 91 and driven by suitable gearing 92, as will be readily understood. The finisher and cooled absorber apparatus are of substantially the same construction. The dry ore material introduced through a rotary valve 95 from the storage 77 is passed back and forth across the hearth chambers by means of the rake arms, while it is being subjected to the action of strong hydrochloric acid gas in the cooled absorber. The ore material is ultimately transmitted through the pipe 96 to the top of the finisher apparatus, where it is again passed back and forth through another set of reaction chambers and is ultimately ejected through the outlet pipe 91 for further treatment.

In the cooled absorber, the ferric chloride there formed tends to react directly with the zinc sulfide and other refractory zinc compounds and to convert them directly to zinc chloride, with the resultant formation of ferrous chloride. In the finisher, the material is subjected to a counterflow of air, while it is heated to a temperature above the point at which ferric and ferrous chlorides will be dissociated in the presence of air to form chloridizing gases. The air is introduced through the pipe 98 to oxidize the iron chlorides and passes in counterflow relation to the descending ore. Hot gases enter through the pipe 99 into the annular chamber surrounding the finisher reaction chambers and serve to maintain the required temperature. These gases are exhausted through pipe 100, from which they may be passed to the fan 65 to heat the spray drier. In the finisher, the ore material intermingled with both ferric and ferrous chlorides is rapidly heated to a temperature of 300° C., more or less, and the iron chlorides then combine with the air to form nascent chlorine. Such water as is present may also serve to form hydrochloric acid gas. The ore material passing downwardly through the finisher is subjected to these chloridizing gases, and the residual zinc compounds are thus chloridized. The residual gases coming from the finisher do not pass into the cooled absorber, but these as well as the waste gases passing downwardly through the cooled absorber are collected by the pipe 100 and forced by the fan into the spray drier or other suitable apparatus. Hence, the atmosphere in the cooled absorber may be controlled. In the finisher, the entering ore is quickly heated and the water of crystallization evaporated and removed from the upper end of the apparatus. The nascent chlorine is in intimate contact with the ore and converts the zinc sulfides, ferrates, ferrites, etc. to the chloride. Other compounds are similarly chloridized. Further details of the absorber and finisher treatment will be found in the above-mentioned patents.

The dry ore residue containing ferric oxide, zinc chloride and the gangue which issues through pipe 97 may now be treated as desired. For example, one may leach the material with water, as indicated diagrammatically in Fig. 1, to dissolve the zinc chloride. The solution may be filtered from the residue containing the ferric oxide and other materials making up the gangue.

It will now be appreciated that I have provided a complete process for chloridizing either a simple or a complex ore, and particularly ores containing zinc, iron, copper, lead, silver and other sulfides. If lead is present, it will issue from the finisher to a large extent as lead chloride, but lead sulfate and lead oxide may also be present, and these will be removed from the ore residue by suitable means, such as by leaching the residue with a hot, strong solution of sodium chloride in water. Other desired elements may be likewise suitably removed. The process is open to many variations, depending upon the ore being treated, and may be easily controlled during the various stages. The chloridizing steps are largely cyclic in their re-use of the reagent materials, and thus the process is rendered highly economical as well as efficient. Many other advantages will be apparent in view of the above disclosure.

This method is particularly effective for chloridizing an ore material having a high zinc content, in which a large proportion of the zinc is removed by the calcium chloride-carbon dioxide treatment and thus leaves a residue which has only a low content of zinc for treatment in a substantially dry condition in the absorber-finisher steps of the process. Zinc chloride is highly deliquescent and if a large proportion of zinc chloride were formed in the roasted ore material and not removed, it would tend to absorb water of reaction and form a viscous, syrupy or soupy mass which would not be easily penetrated by the reagent gases. By the present procedure, a large proportion of the zinc oxide may be removed from the roasted ore before the material goes to the dry chloridizing step.

It will also be appreciated that if the ore has been so roasted that the major portion of the zinc is a sulfate instead of an oxide, a solution of an alkaline earth metal chloride may be used without the carbon dioxide to convert that sulfate to a chloride. The later stages of the process, including the spray drying and subsequent chloridizing or other solubilizing operations, are applicable for treating various ore materials which do not require the initial carbonating treatment above described. It will, therefore, be appreciated that although the various stages of this process combine to a unitary and useful result, yet various features of the process may be employed by themselves and in connection with many types of ore for solubilizing values therein.

Having thus described the invention, what I claim as new and desire to secure by Letters Patent is:

1. The method of chloridizing an ore material containing zinc oxide comprising the steps of treating the ore material in finely divided condition with a solution of alkaline earth metal chloride and carbon dioxide gas and thereby forming zinc chloride and alkaline earth metal carbonate, separating the solution from the ore residue, treating the latter with a reagent capable of solubilizing the alkaline earth metal compound, removing the soluble compound from the ore material and thereafter treating the residue in a substantially dry condition with a chloridizing reagent.

2. The method of treating an ore material containing zinc oxide comprising the steps of subjecting the ore material in finely divided condition to the action of a solution of an alkaline earth metal chloride and carbon dioxide gas to form an ore metal chloride and alkaline earth metal carbonate, treating the residue with a chloridizing agent capable of converting the carbonate to alkaline earth metal chloride and forming a solution thereof, separating the solution from the residue and returning the solution for the initial chloridizing step.

3. The method of claim 1 in which the residue is subjected to the action of a chloridizing gas containing hydrochloric acid while in a substantially dry condition.

4. The method of chloridizing an ore containing zinc sulfide comprising the steps of roasting the ore and providing zinc oxide together with another refractory but chloridizable zinc compound, treating the roasted material in finely divided condition with alkaline earth metal chloride in solution and carbon dioxide gas to form zinc chloride and alkaline earth metal carbonate, removing the zinc chloride solution from the ore residue, treating the latter with an acid capable of converting the alkaline earth metal carbonate to a soluble compound, separating the soluble compound from the residue, and thereafter drying the residue and subjecting it to the action of chloridizing gases to convert the refractory zinc compound to a chloride.

5. The method of solubilizing values in an ore material comprising the steps of treating the same in a finely divided condition and in the presence of water with a sulfating reagent capable of solubilizing an ore metal compound, removing the major portion of the solution, spraying the wet ore material in the presence of a heated gas to dry the same and form a finely divided powder, containing ore metal values thereafter subjecting the dried powder to the action of a gaseous chloridizing reagent capable of solubilizing further ore metal values.

6. The method of chloridizing an ore material in finely divided condition comprising the steps of subjecting it in the presence of water to a chloridizing agent, removing the solution, thereafter drying the ore residue by spraying it in a closed chamber in the presence of a heated gas and thus forming a finely divided powder, and thereafter subjecting the powder to the action of a chloridizing gas while in a substantially dry condition and thereby chloridizing further ore metal values therein.

7. The method of treating a sulfide ore comprising the steps of roasting the ore to burn off sulfide sulfur, leaching the roasted material to remove a soluble ore metal compound and thereby providing a pulp of finely divided ore material intermixed with water, spraying this wet pulp into a closed chamber while subjecting it to the influence of a heated gas and removing the waste gas and evaporated water from the chamber and thereby providing a finely divided dried ore material, and subsequently subjecting the ore material in a substantially dry condition to the action of a gaseous reagent capable of solubilizing an ore metal value therein.

8. The method of treating a zinc sulfide ore comprising the steps of roasting the ore to burn off sulfide sulphur and form a zinc oxygen compound, leaching from the roasted material a portion of the zinc content thereof and providing a pulp of finely divided ore material and water, spraying this pulp into a closed chamber and subjecting it to the influence of heated gases and thereby removing the water content of the pulp and providing a fine divided, substantially dry ore material, and thereafter treating this dry ore material with a chloridizing gas which penetrates the same and forms a chloride of an ore metal value therein.

9. The method of chloridizing an ore material comprising the steps of providing a sludge of the material in finely divided condition in intermixture with water, spraying the sludge in the presence of a heated chloridizing gas and simultaneously evaporating the water therefrom and chloridizing an ore value and thereby forming a substantially dry granular material containing an ore metal chloride, and thereafter treating said material to recover the ore metal chloride.

10. The method of chloridizing an oxidized zinc ore comprising the steps of treating the material in a finely divided condition with a solution of alkaline earth metal chloride and carbon dioxide gas, thereafter spraying a pulp of the ore material and water in the presence of a hot gas comprising a chloridizing reagent and thereby forming a dry granular ore material containing zinc chloride, treating the dry material with a gaseous reagent to chloridize further ore values, and subsequently dissolving the zinc chloride from the residue.

11. The method of chloridizing a zinc bearing ore material comprising the steps of treating it in the presence of water with a chloridizing reagent, thereafter drying the ore material by spraying it into a closed chamber in the presence of a heated gas and forming a substantially dry powder, then heating the powder intermixed with iron chloride and in the presence of air to dissociate the iron chloride and form a chloridizing gas for chloridizing further ore metal values.

12. The method of claim 11 in which chloridizing gases from the final stage which are formed by decomposing the iron chloride are conveyed to the spray drier for chloridizing the ore material during the drying operation.

13. The method of treating a zinc sulfide ore comprising the steps of roasting the ore to form zinc oxide and/or zinc sulfate, treating the zinc-oxygen compound with a solubilizing reagent and dissolving and removing the same from the ore material, and thus providing a pulp of ore residue and water, spraying this pulp into a closed chamber while subjecting it to the action of heated gases and thereby removing water therefrom, and treating the dry ore material in a substantially dry condition with a chloridizing gas and converting a zinc compound therein to zinc chloride.

14. The method of chloridizing a complex ore material containing a high content of zinc oxide, comprising the steps of treating the material in a finely divided condition with alkaline earth metal chloride in solution and carbon dioxide gas to convert zinc oxide to the chloride, repeatedly recirculating the solution and gas into contact with the ore material until the zinc oxide content of the ore has been largely chloridized, then removing the ore residue from the zinc chloride solution and drying it, and thereafter treating the residue in a substantially dry condition with a chloridizing gaseous reagent and converting a further ore metal value to a chloride.

15. The method of recovering values from an ore material comprising the steps of treating the material in the presence of water with a reagent capable of converting an ore metal value to a soluble compound and forming a mixture of finely divided ore material and water, spraying the mixture into a heated gas containing a chloridizing agent and simultaneously evaporating and removing the water therefrom and forming a substantially dry and finely divided material containing an ore metal chloride, and thereafter treating the dried material to recover values therefrom.

THOMAS A. MITCHELL.